US012576356B2

(12) United States Patent
Beall et al.

(10) Patent No.: US 12,576,356 B2
(45) Date of Patent: Mar. 17, 2026

(54) REINFORCED EXHAUST TREATMENT ARTICLE, EXHAUST LINE, AND METHODS

(71) Applicant: CORNING INCORPORATED, Corning, NY (US)

(72) Inventors: Douglas Munroe Beall, Painted Post, NY (US); Vishwanath Ganpat Deshmane, Chesterbrook, PA (US); Sam George, Naperville, IL (US); Achim Karl-Erich Heibel, Corning, NY (US); Sandeep Viswanathan, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/073,897

(22) Filed: Mar. 7, 2025

(65) Prior Publication Data

US 2025/0205627 A1     Jun. 26, 2025

Related U.S. Application Data

(62) Division of application No. 17/899,009, filed on Aug. 30, 2022, now Pat. No. 12,257,539.

(60) Provisional application No. 63/239,145, filed on Aug. 31, 2021.

(51) Int. Cl.
| | |
|---|---|
| *B01D 46/24* | (2006.01) |
| *B01D 39/20* | (2006.01) |
| *B01D 46/00* | (2022.01) |
| *C04B 38/00* | (2006.01) |

(52) U.S. Cl.
CPC ..... *B01D 46/2418* (2013.01); *B01D 39/2068* (2013.01); *B01D 46/0001* (2013.01); *C04B 38/0006* (2013.01); *C04B 38/0096* (2013.01); *B01D 2279/30* (2013.01)

(58) Field of Classification Search
CPC ........ B01D 2239/0258; B01D 2279/30; B01D 39/2068; B01D 46/0001; B01D 46/2418; C04B 2111/00413; C04B 2111/00793; C04B 35/185; C04B 35/195; C04B 35/465; C04B 35/478; C04B 35/565; C04B 38/0006; C04B 38/0096; Y02T 10/12

See application file for complete search history.

(56) References Cited

U.S. PATENT DOCUMENTS

| | | | |
|---|---|---|---|
| 4,528,279 | A | 7/1985 | Suzuki et al. |
| 5,945,369 | A | 8/1999 | Kimura et al. |
| 6,939,825 | B1 | 9/2005 | Ohno et al. |

(Continued)

*Primary Examiner* — Jesse S Bogue

(57) ABSTRACT

An exhaust treatment apparatus for treating exhaust gas flowing through an exhaust line housing from an upstream location to a downstream location in a downstream direction, the exhaust treatment apparatus comprising a ceramic filter body having a honeycomb structure of a plurality of intersecting porous ceramic walls extending from a first end to a second end in an axial direction and defining a plurality of channels extending in the axial direction, wherein a first transverse face at the first end comprises metal oxide particles affixed to a portion of the intersecting walls. The metal oxide particles may be affixed to the upstream end, or the downstream end, or both the upstream and downstream ends. Preferably the metal oxide particles provide reinforcement to the underlying portion of the walls, and of the honeycomb structure itself.

18 Claims, 5 Drawing Sheets

'Downstream' direction of exhaust gas flow

Exhaust gas flow

DOC   DPF   SCR

Duct   Duct   Reducing Agent Injection

(56) References Cited

U.S. PATENT DOCUMENTS

| | | | | |
|---|---|---|---|---|
| 7,981,370 | B2 | 7/2011 | Ohno et al. | |
| 8,105,559 | B2 | 1/2012 | Melville et al. | |
| 9,308,524 | B2 * | 4/2016 | Yin | B82Y 30/00 |
| 11,117,124 | B2 * | 9/2021 | Beall | C04B 38/0009 |
| 11,498,056 | B2 * | 11/2022 | Kakinohana | B01J 23/63 |
| 12,091,366 | B2 * | 9/2024 | Addiego | B01D 39/2034 |
| 12,134,059 | B2 * | 11/2024 | Tandon | B01D 46/2498 |
| 2007/0281856 | A1 | 12/2007 | Sasaki et al. | |
| 2008/0118701 | A1 * | 5/2008 | Ohno | F01N 3/0222 |
| | | | | 428/116 |
| 2008/0119355 | A1 * | 5/2008 | Ohno | C04B 35/117 |
| | | | | 502/340 |
| 2013/0199966 | A1 | 8/2013 | Koranne et al. | |
| 2014/0234188 | A1 | 8/2014 | Hartland | |
| 2023/0159401 | A1 * | 5/2023 | Patil | C04B 14/303 |
| | | | | 106/287.17 |

\* cited by examiner

'Downstream' direction of exhaust gas flow

Exhaust gas flow

DOC          DPF          SCR

Duct          Duct          Reducing Agent Injection

SCR

Reducing Agent Injection

Duct

Exhaust gas flow

DPF

'Downstream' direction of exhaust gas flow

Duct

DOC

Exhaust Flow

DPF

Reducing Agent Injector (Urea/DEF) Flow

REINFORCED EXHAUST TREATMENT ARTICLE, EXHAUST LINE, AND METHODS

CROSS-REFERENCE TO RELATED APPLICATIONS

This application is a divisional of U.S. patent application Ser. No. 17/899,009 filed on Aug. 30, 2022 which claims the benefit of priority under 35 U.S.C. § 119 of U.S. Provisional Application Ser. No. 63/239,145 filed on Aug. 31, 2021, the content of which is relied upon and incorporated herein by reference in its entirety.

TECHNICAL FIELD

Embodiments of the present disclosure generally relate to engine exhaust treatment article, in particular exhaust treatment apparatus with a reinforced honeycomb body, such as a particulate filter with a reinforced end portion.

BACKGROUND

Particulate filters, for example, diesel particulate filters (DPFs), filter particulates from the exhaust stream from engines such as engines burning diesel fuel, respectively. In various engine exhaust configurations, a catalytically active particulate filter may provide a reduced space requirement and/or increased catalytic performance for exhaust flows. Some exhaust treatment systems use a selective catalytic reduction (SCR) component which utilize injection of a reducing agent such as ammonia or urea.

SUMMARY

In one aspect, a ceramic filter body is disclosed herein comprising a honeycomb structure comprised of a plurality of intersecting walls extending from a first end to a second end in an axial direction and defining a plurality of channels extending in the axial direction, wherein a first transverse face at the first end comprises metal oxide particles affixed to only an end portion of the intersecting walls, wherein the walls having the metal oxide particles affixed are free of the metal oxide particles in a middle portion of the walls. In some embodiments, the metal oxide particles are affixed to only a first and second end portions of the intersecting walls, wherein the second end portion is opposite the first end portion in the axial direction.

Preferably, the metal oxide particles are comprised of metal oxide nanoparticles and metal oxide microparticles. In some embodiments, the metal oxide nanoparticles comprise alumina. In some embodiments, the metal oxide microparticles comprise alumina. In some embodiments, the metal oxide nanoparticles comprise gamma alumina. In some embodiments, the metal oxide microparticles comprise gamma alumina. The metal oxide microparticles and nanoparticles may comprise alumina, silica, zirconia, or ceria.

In another aspect, a ceramic filter body is disclosed herein comprising a honeycomb structure comprised of a plurality of intersecting walls extending from a first end to a second end in an axial direction and defining a plurality of channels extending in the axial direction, wherein a first transverse face at the first end comprises alumina particles affixed to a portion of the intersecting walls. In some embodiments, the alumina particles are comprised of alumina nanoparticles and alumina microparticles. In some embodiments, greater than 90% of the alumina particles are gamma alumina particles. In some embodiments, all of the alumina particles are gamma alumina particles. In some embodiments, the intersecting walls are comprised of porous ceramic walls. In some embodiments, at least some of the alumina particles are disposed within the porosity of the porous ceramic walls. In some embodiments, a majority of the alumina particles are disposed on surfaces of the porous ceramic walls. In some embodiments, the alumina particle are bound to the intersecting walls. In some embodiments, the honeycomb body further comprises a non-alumina catalyst material supported by the honeycomb structure. In some embodiments, the alumina particles are free of catalyst material. In some embodiments, the alumina particles are present to a depth extending axially into the honeycomb structure of 0.01 to 2.0 inches from the first transverse face. In some embodiments, the alumina particles are present to a depth extending axially into the honeycomb structure of 0.5 to 1.0 inches from the first transverse face.

In some embodiments, the alumina particles are present at an alumina particle density of 10-300 grams per liter of honeycomb structure which is in contact with the alumina particles. In some embodiments, the alumina particles are present at an alumina particle density of 40-200 grams per liter of honeycomb structure which is in contact with the alumina particles.

In some embodiments, the intersecting walls are comprised of a porous ceramic material other than alumina. In some embodiments, the intersecting walls are comprised of at least one ceramic phase selected from the group consisting of cordierite, aluminum titanate, mullite, magnesium titanate, and silicon carbide.

In another aspect, a ceramic filter body is disclosed herein comprising a honeycomb structure comprised of a plurality of intersecting walls comprised of cordierite and extending from a first end to a second end in an axial direction and defining a plurality of channels extending in the axial direction, wherein a first transverse face at the first end comprises gamma alumina oxide particles affixed to only an end portion of the intersecting walls, wherein the walls having the gamma alumina oxide particles affixed are free of the gamma alumina oxide particles in a middle portion of the walls. In some embodiments, the gamma alumina oxide particles are comprised of a first distribution of nanoparticles and a second distribution of microparticles. In some embodiments, the metal oxide particles are affixed to only a first end portion and a second end portion of the intersecting walls, wherein the second end portion is opposite the first end portion.

In another aspect, a ceramic filter body is disclosed herein comprising a honeycomb structure comprised of a plurality of intersecting walls comprised of cordierite and extending from a first end to a second end in an axial direction and defining a plurality of channels extending in the axial direction, wherein a first transverse face at the first end comprises alumina oxide particles affixed to only an end portion of the intersecting walls, wherein the walls having the metal oxide particles affixed are free of the metal oxide particles in a middle portion of the walls; wherein the alumina oxide particles are comprised of a first distribution of alumina nanoparticles and a second distribution of alumina microparticles.

In some embodiments, the alumina oxide particles are affixed to only a first end portion and a second end portion of the intersecting walls, wherein the second end portion is opposite the first end portion. In some embodiments, greater than 90% of the alumina particles are gamma alumina particles. In some embodiments, all of the alumina particles are gamma alumina particles.

In some embodiments, the intersecting walls are comprised of porous ceramic walls. In some embodiments, at least some of the alumina particles are disposed within the porosity of the porous ceramic walls. In some embodiments, a majority of the alumina particles are disposed on surfaces of the porous ceramic walls. In some embodiments, the alumina particle are bound to the intersecting walls.

In some embodiments, the honeycomb body further comprises a non-alumina catalyst material supported by the honeycomb structure. In some embodiments, the alumina particles are free of catalyst material.

In some embodiments, the end portion with alumina particles present has an axial depth of 0.01 to 2.0 inches from the first transverse face. In some embodiments, the end portion with alumina particles present has an axial depth of 0.5 to 1.0 inch from the first transverse face.

In some embodiments, the alumina particles are present at an alumina particle density of 10-300 grams per liter of honeycomb structure which is in contact with the alumina particles. In some embodiments, the alumina particles are present at an alumina particle density of 40-200 grams per liter of honeycomb structure which is in contact with the alumina particles.

In another aspect, a method of reinforcing a ceramic body is disclosed herein comprising a honeycomb structure comprised of a plurality of intersecting walls extending from a first end to a second end in an axial direction and defining a plurality of channels extending in the axial direction, the method comprising: applying an alumina particle mixture to a first end portion at the first end of the honeycomb structure, wherein the alumina particle mixture is comprised of boehmite nanoparticles and gamma alumina microparticles; heating the honeycomb structure for a time and at one or more temperatures sufficient to convert at least some of the boehmite nanoparticles on the honeycomb structure into gamma alumina nanoparticles. In some embodiments, the heating causes the alumina particles to become affixed to the intersecting walls. In one aspect, 24. the method further comprises, before the heating, applying an alumina particle mixture to the second end of the honeycomb structure, wherein the alumina particle mixture is comprised of boehmite nanoparticles and gamma alumina microparticles.

In some embodiments, the heating further comprises heating the honeycomb structure for a time and at one or more temperatures sufficient to convert all of the boehmite nanoparticles on the honeycomb structure into gamma alumina nanoparticles.

In some embodiments, the heating further comprises heating the honeycomb structure for a time and at one or more temperatures sufficient to convert 90% or greater of the boehmite nanoparticles on the honeycomb structure into gamma alumina nanoparticles.

In some embodiments, the gamma alumina particles provide a reinforced first end or first end portion of the honeycomb structure.

In some embodiments, the heating comprises heating the first end of the honeycomb structure.

In some embodiments, the alumina particle mixture comprises a liquid, such as water, and gamma alumina particles and is applied to the honeycomb structure as a wet mixture.

In some embodiments, the alumina particle mixture supported by the honeycomb structure is dried by the heating.

In some embodiments, the alumina particle mixture supported by the honeycomb structure is calcined by the heating.

In some embodiments, the heating comprises drying then calcining the applied coating.

In some embodiments, the alumina particle mixture is a slurry mixture.

In some embodiments, the alumina particle mixture is applied to a depth into the honeycomb structure of 0.01 to 2.0 inches from a first transverse face at the first end. In some embodiments, the alumina particle mixture is applied to a depth into the honeycomb structure of 0.5 to 1.0 inches from a first transverse face at the first end.

In some embodiments, the alumina particles are present at an alumina particle density of 10-300 grams per liter of honeycomb structure which is in contact with the alumina particles. In some embodiments, the alumina particles are present at an alumina particle density of 40-200 grams per liter of honeycomb structure which is in contact with the alumina particles.

In some embodiments, the intersecting walls are comprised of porous ceramic walls. In some embodiments, at least some of the alumina particles are disposed inside the porous walls. In some embodiments, at least some of the alumina particles are disposed on the porous walls. In some embodiments, a first portion of the alumina particles are disposed inside the porous walls and a second portion of the alumina particles are disposed on the porous walls. In some embodiments, after the heating step at least 90% of the alumina particles are gamma alumina particles.

In some embodiments, all of the alumina particles are gamma alumina particles after the heating step.

In some embodiments, the honeycomb body further comprises a catalyst material supported by the honeycomb structure.

In another aspect, a method of treating exhaust gas flowing from an upstream location to a downstream location in an exhaust line is disclosed herein, the method comprising providing an exhaust component, comprised of a honeycomb structure having porous walls having a porosity of greater than 40% wherein an end portion of the porous walls is reinforced with a coating of a metal oxide, wherein the exhaust component is provided in the exhaust line and configured such that the reinforced end portion is oriented within the exhaust line in the direction of a reducing agent entry port. In some embodiments, the reinforced end portion is disposed adjacent to a reducing agent entry port.

Additional embodiments of the disclosure are disclosed herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Figures 1, 2, 3:
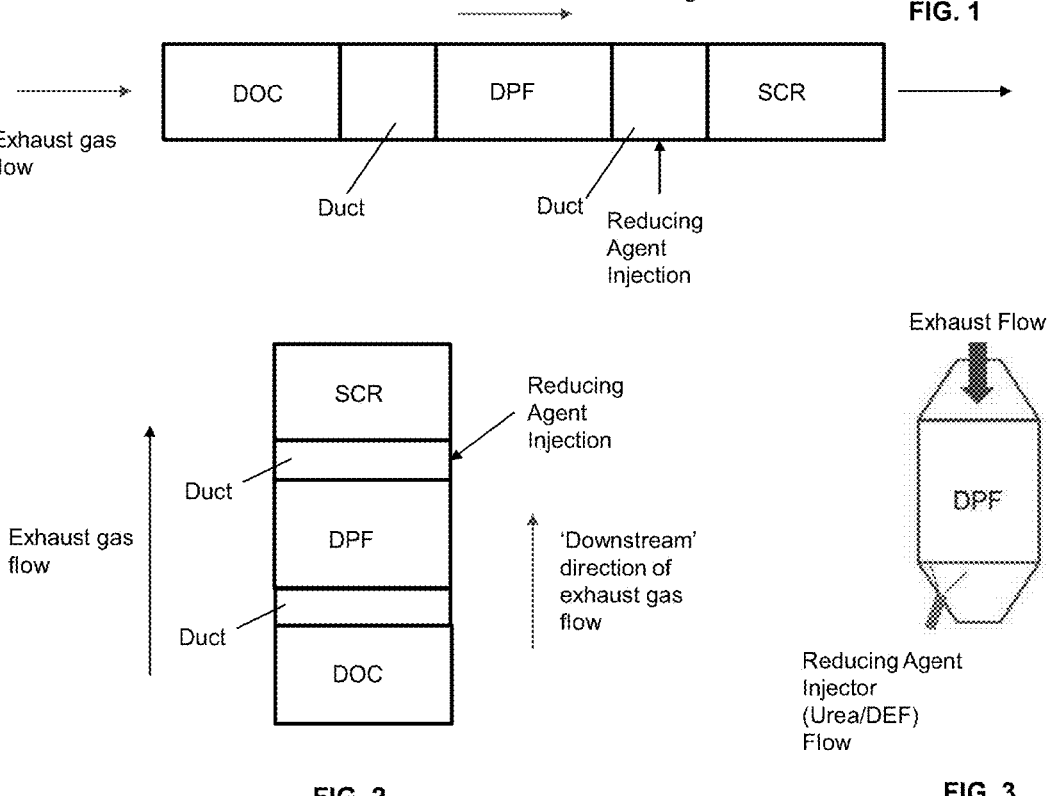
FIG. 1 schematically illustrates an apparatus or an exhaust system comprising an exhaust line comprising a DOC+DPF+SCR architecture with an injector and mixer system upstream of the SCR, representative of a horizontal configuration or orientation.
FIG. 2 schematically illustrates an apparatus or an exhaust system comprising an exhaust line comprising a DOC+DPF+SCR architecture with an injector and mixer system upstream of the SCR, representative of a vertical configuration or orientation.
FIG. 3 schematically illustrates a test set up used to evaluate or replicate potential damage to a filter wherein a reducing agent injector is disposed downstream of a diesel particulate filter (DPF).

For exhaust treatment systems that use a selective catalytic reduction (SCR) component which utilize injection of a reducing agent such as ammonia or urea, under non-ideal conditions there is potential that a reducing agent or byproducts thereof come into contact and/or get deposited on a susceptible exhaust component such as the particulate filter and accumulate, contaminate, and/or damage the exhaust component. For example, as schematically illustrated in FIG. 1, an exhaust system may comprise an exhaust line comprising a DOC+DPF+SCR architecture with an injector and mixer system upstream of the SCR which delivers a reducing agent like ammonia or urea or mixtures containing ammonia or urea, like Diesel Exhaust Fluid ("DEF") or "AdBlue™" which is an aqueous solution of 32.5% urea and 67.5% DI water. Although the reducing agent (such as DEF solution) is expected to decompose in the exhaust gas stream beyond 200° C., in vertically oriented systems as schematically illustrated in FIG. 2, the agent might condensate and drop down onto the DPF, and in horizontally oriented systems as illustrated in FIG. 1, the agent might pool up and accumulate over time, eventually coming into contact with the DPF, or in either the vertical or horizontal exhaust line configurations, the spray from the reductant injector could contact the DPF. Systems oriented at an inclined angle may also experience one or more of these non-ideal conditions. When an exhaust component such as a filter is coated with SCR catalyst, the DEF is introduced upstream of the filter. Thus there is the possibility of DEF introduction on both ends of the filters depending on system design.

We have surprisingly found that damage to a ceramic article (such as a particulate filter) which is caused or induced by exposure or prolonged exposure to a reducing agent or its byproducts, like DEF or byproducts of DEF, can be mitigated and even prevented by reinforcing the ceramic article by application of an inorganic material, such as a metal oxide such as an alumina containing material. For example, a section of the end face region of the honeycomb body is coated with the inorganic material such that the coating mitigates or prevents the undesired matter like byproducts of DEF from penetrating into a ceramic filter wall, its porosity and/or microcracks.

In some embodiments, the coating material applied to a porous ceramic article comprises an inorganic material selected from the group consisting of alpha alumina, gamma alumina, boehmite, colloidal silica, and colloidal zirconia. In some embodiments the ceramic article is particulate filter; the particulate filter may comprise a matrix of walls forming cells at least some of which are plugged, and in some preferred embodiments are plugged either near the inlet end or the outlet end in a plugging pattern, such as a checkerboard pattern, which in operation causes exhaust gas to flow through porous walls, thus trapping solid or particulate matter inside the filter.

In some embodiments, the coating material is applied locally, that is to the end face region of a porous ceramic article which is exposed to the reducing agent (e.g. DEF).

The coating can be applied to the end face of a ceramic honeycomb body such that the coating material extends or reaches to a depth into the honeycomb body of greater than 0.5 inch; in some embodiments the coating material extends between 0.5 and 2 inches into the channels of the honeycomb body, and in some embodiments extends between 0.5 and 1 inch into the channels of the honeycomb body. The coating material thus coats only a portion of the inside walls of the honeycomb article which define honeycomb channels, at not the entire inside wall surfaces of the honeycomb article which define honeycomb channels.

In some embodiments the loading level (volume loading) of the coating material is between about 40 grams/liter (g/l) and 200 g/l of coating material per volume of honeycomb body which is covered by the coating material. In some embodiments, the coating material partially fills, or fills, the porous structure of the ceramic article in the area of interest, that is the coated volume portion.

In some embodiments, the coating material comprises a catalytically active component, either an alumina containing component, or other than an alumina component ("non-alumina catalytically active component").

In other embodiments, the coating material contains no catalytically active component, such as no non-alumina catalytically active component.

Preferably, the coating material is a mixture of nanoparticles and microparticles, the particles being comprised of one or more metal oxides, particularly when the coating material is applied to a high porosity porous ceramic article, such as comprising a porosity of 40% or greater, such as 40 to 90%, or 40 to 80%, or 40 to 75%, or 40 to 70%, or 50 to 90%, or 50 to 80%, or 50 to 75%, or 50 to 70%, or 50 to 60%, or 55 to 90%, or 55 to 80%, or 55 to 75%, or 55 to 70%, or 55 to 65%, as measured by mercury porosimetry. In some embodiments, the coating material mixture comprises alumina nanoparticles and alumina microparticles. In some embodiments, the alumina nanoparticles have a median particle size of 10 to 50 nm, or 15 to 45 nm, or 20 to 40 nm. In some embodiments, the alumina microparticles have a median particle size of 0.1 to 20 μm, or 1 to 20 μm, or 1 to 10 μm, or 1 to 5 μm, or 2 to 5 μm.

Without needing to be bound by theory, we have found that the nanoparticles appear to serve as an inorganic binder for and among the microparticles within the applied coating, as well as serving as a binder between the coating and the porous ceramic walls of the article being coated, particularly after having been heat treated such as by heating which calcines one or more constituents of the coating. Preferably, the calcining heating step is at one or more temperatures and for a duration long enough to calcine one or more constituents in the coating. For example, the porous ceramic article is exposed to a heating environment comprising one or more temperatures for one or more times which is sufficient to calcine and convert or decompose or transform one of the constituents into another phase, for example the aluminum hydroxide in the boehmite can be converted into gamma alumina by heat treating, or calcining, at temperatures of 400 to 600 C, or 500 to 600 C. Other crystalline forms of alumina such as delta, theta, alpha alumina may also be used. As the calcination temperature increases, aluminum hydroxide changes crystalline form from aluminum hydroxide to gamma-alumina (~400-800 C) to delta alumina (~800-900 C) to theta alumina (~900-1000 C)—to alpha alumina (>1000C).

EXAMPLES

Two different coating material mixtures were prepared: #1: AL20 which is a boehmite sol (—AlO(OH) wt % of 23.5 wt %) (nanoparticles of aluminum oxide hydroxide, or aluminum oxyhydroxide, having a median particle size of 20 to 40 nm) and #2: an aqueous slurry of (a) dry milled gamma alumina powder (gamma alumina microparticles) mixed with (b) AL20 boehmite (aluminum oxide hydroxide nanoparticles). Without being bound by theory, we believe that the boehmite in coating material mixture #2 acted as a binder as discussed above. Each respective coating material mixture (#1 or #2) was applied to an end of plugged porous ceramic honeycomb bodies of several diesel particulate filters (DPFs), wherein the matrix of walls of the DPFs were comprised of cordierite with porosity of 55%, to a desired coating axial depth. After the coating material mixture was applied, each honeycomb body was dried at 110° C. for 12 hrs and then heated (calcined) at 550° C. for 3 hr. During the calcination heating process, the boehmite in each coating (#1 and #2) was essentially all converted to gamma alumina nanoparticles. Thus, the alumina-based nanoparticles in the calcined coating, or washcoat, were gamma alumina nanoparticles, whether the nanoparticles came from either the AL20 in mixture #1 (which was 100% alumina-based nanoparticles), or in the mixture #2 from the 20 wt % boehmite contribution of the alumina-based nanoparticles constituent (as binder nanoparticles) that was mixed with 80 wt % of gamma alumina microparticle powder.

FIG. 3 schematically illustrates a test set up used to evaluate or replicate potential damage to a filter wherein a reducing agent injector is disposed downstream of a diesel particulate filter (DPF). The various uncoated and coated particulate filters having 200 cells/square inch and 8 mil thick walls (200/8) were exposed to DEF for 6 hours. We observed the same phenomenon for 300/7 ACT design, i.e. with larger inlet channels than outlet channels.

Figure 4:
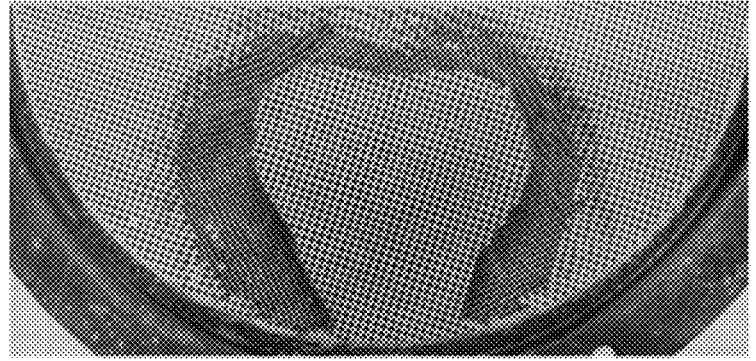
FIG. 4 is a photographic image of a cross-section of a diesel particulate filter with no coating or reinforced portion, which illustrates the damage that was sustained as a result of contact with DEF fluid and/or byproducts thereof.

FIG. 4 shows the case of a DPF honeycomb body without any coating reinforcement applied, in which case significant damage was observed, including loss of plugs and portions of matrix walls.

Figure 5:
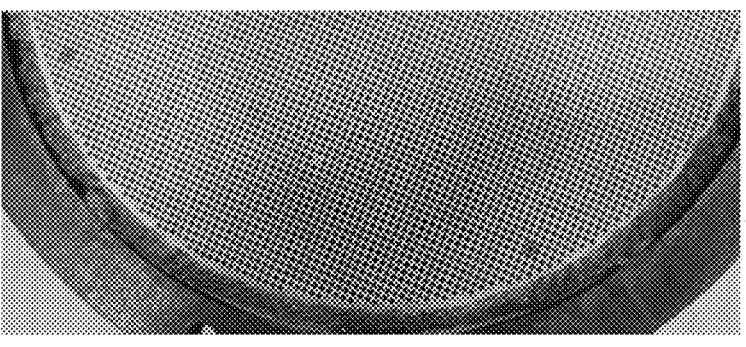
FIG. 5 is a photographic image of a transverse plugged end face of a diesel particulate filter with a reinforced portion comprising a coating from a loading of 80 g/l first coating material mixture as disclosed herein, which illustrates mitigation of damage from contact with DEF fluid and/or byproducts thereof after 6 hours of DEF exposure testing.
Figure 6:
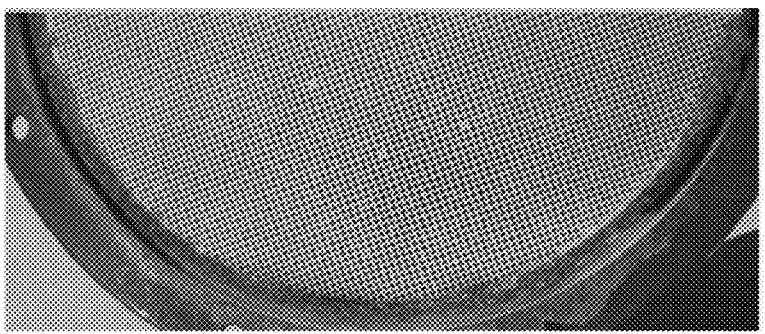
FIG. 6 is a photographic image of a transverse plugged end face of a diesel particulate filter with a reinforced portion comprising a coating from a loading of 160 g/l first coating material mixture as disclosed herein, which illustrates mitigation of damage from contact with DEF fluid and/or byproducts thereof after 6 hours of DEF exposure testing.

FIGS. 5 and 6 are cases of honeycomb bodies with coating applications of 80 g/l and 160 g/l of mixture #1 (AL20), respectively. The 80 g/l AL20 coating was coated up to approximately 0.5" depth from the outer surface at one end. The 160 g/l AL20 coating was applied to the honeycomb body which was coated up to approximately 1" depth from the outer surface at one end. As used herein, these local washcoat loadings mean the loadings are calculated based on the coated region (0.5" or 1" depth) only and not based on the volume of full part (honeycomb body). In both cases, there was essentially no damage observed on the face of the DPF after same amount of DEF exposure, as seen in FIGS. 5 and 6.

Figure 7:
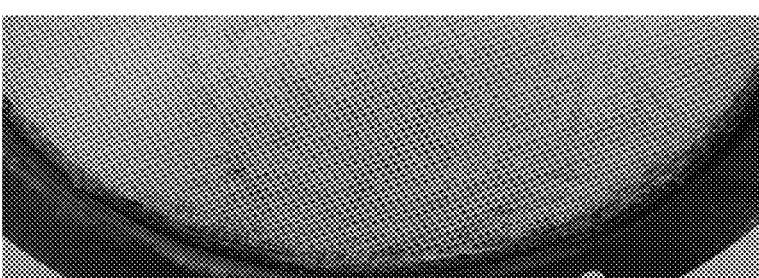
FIG. 7 is a photographic image of a transverse plugged end face of a diesel particulate filter with a reinforced portion comprising a coating from a loading of 160 g/l second coating material mixture as disclosed herein, which illustrates mitigation of damage from contact with DEF fluid and/or byproducts thereof after 6 hours of DEF exposure testing.

FIG. 7 shows the case with 160 g/l mixture #2 (gamma alumina) which was coated up to approximately 1" depth from the outer surface of one end. Other than some minor erosion on the face, we observed that there was no significant damage on the face of the diesel particulate filter (DPF) which had coating based on mixture #2, particularly as compared to the case without any coating in FIG. 4.

Internally, the honeycomb matrix walls defining channels (channel walls) were inspected via borescope inspection which showed internal channel wall damage for many channels inspected in the DEF exposure zone within the first 1" or so from the outlet end for the cases coating from mixture #1 at a loading of 80 g/l (FIG. 8) and 160 g/l (FIG. 9) nanoparticles, whereas the filter with coating from mixture #2 (gamma alumina microparticles plus boehmite nanoparticles) did not show incidents of internal channel damage.

Figure 10:
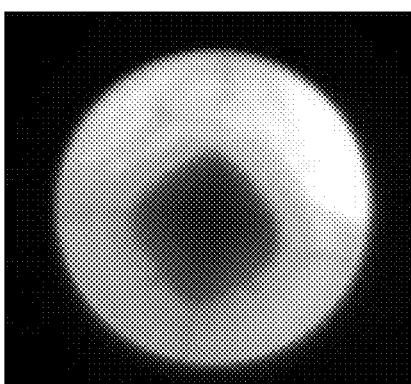
FIG. 10 is a photographic image using a borescope of channel walls of a diesel particulate filter with a reinforced portion comprising a coating from a loading of 160 g/l second coating material mixture as disclosed herein, after 6 hours of DEF exposure testing.

FIG. 10 shows a borescope image for the filter with coating from mixture #2; further we observed that this coating was primarily an on-wall coating, which we have found serves to prevent urea byproducts from penetrating and/or damaging the wall porosity of the porous wall, thereby preventing damage due to exposure to DEF and/or its byproducts.

Pressure drop across particulate filters can depend on a number of factors such as wall thickness, cell density (cells per square inch, or CPSI), flow conditions, etc., which may be taken into consideration when selecting a type of coating material mixture, its amount applied or coating load, its applied thickness, its thickness upon calcining, and/or other parameters.

Figure 11:
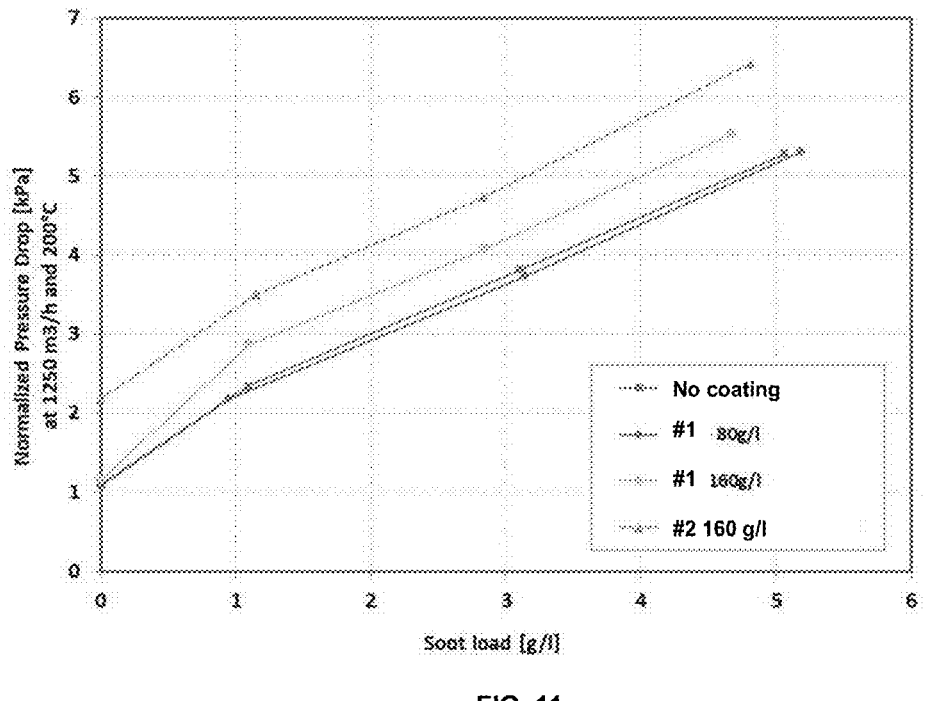
FIG. 11 schematically illustrates the normalized pressure drop (in kPa) across the filters of FIGS. 5, 6, and 7 at 1250 m3/hour and 200° C. at various soot loadings (in g/l: grams of soot per liter of filter volume).

As one example set, FIG. 11 shows pressure drops for a baseline filter without any coating and for filters with different coatings: (a) from coating material mixture #1 at 80 g/l loading; (b) from coating material mixture #1 at 160 g/l loading; (c) from coating material mixture #2 at 160 g/l loading. Each of the DPFs with coatings showed a mitigation of damage from DEF exposures.

FIG. 11 shows a pressure drop penalty (pressure drop increase) for the 160 g/l loading cases, while negligible impacts on pressure drop were seen for the 80 g/l case. Similar tests were performed with high porosity, 300 cpsi, 12 mil wall thickness ("300/12") with large inlet channels and smaller outlet channels ("ACT design, or "Corning DC HP 300/12 ACT") without any coating and with 160 g/l coating from mixture #1 (AL20). For the DC HP 300/12 ACT with 160 g/l coating from mixture #1 (AL20), the pressure drop increase was minimal and there was no damage seen either on the face or internally in the channels.

In one set of embodiments, an exhaust treatment apparatus is disclosed herein for treating exhaust gas flowing through an exhaust line housing from an upstream location to a downstream location in a downstream direction, the exhaust treatment apparatus comprising: a first exhaust component disposed within the exhaust line housing, the exhaust component comprising a body comprising an inlet end and an outlet end and an axial length from the inlet end to the outlet end, the body comprising a honeycomb structure comprised of a matrix of intersecting porous walls defining a plurality of cells which extend axially from the inlet end to the outlet end, the walls defining a plurality of axial channels extending axially from the inlet end to the outlet end, wherein the porous walls of the exhaust component comprise a first porosity; a reducing agent injector junction disposed on the exhaust line housing downstream of the exhaust component; The reducing agent injector junction can be disposed downstream of the exhaust component in an exhaust treatment line, or the reducing agent injector junction can be disposed upstream of the exhaust component. In some embodiments, the exhaust component is a particulate filter; in other embodiments the exhaust component is a non-filter exhaust component. In some embodiments, the particulate filter comprises plugs fixed within at least some of the channels, such that the axial channels comprise inlet channels and outlet channels, wherein the inlet channels are open at the inlet end, and the outlet channels are open at the outlet end, to allow flow into the inlet channels and out of the outlet channels in the downstream direction. In some embodiments, the particulate filter is a diesel particulate filter; in other embodiments the particulate filter is a gasoline particulate filter. The particulate filter is provided with a reinforced portion which is coated with a metal oxide coating.

In some embodiments, the reducing agent injector junction is disposed upstream of the particulate filter, and the reinforced portion is coated with a metal oxide coating is disposed on the upstream end of the particulate filter. In other embodiments, the reducing agent injector junction is disposed downstream of the particulate filter, and the reinforced portion is coated with a metal oxide coating disposed on the downstream end of the particulate filter. In some embodiments, another exhaust component is disposed in the exhaust line between reinforced end of the particulate filter and the reducing agent injector junction.

In some embodiments, the reducing agent injection portion is coupled to an SCR unit; in some of these embodiments the reducing agent doser is disposed upstream of an SCR unit; in other of these embodiments the reducing agent doser is incorporated into the SCR unit.

In some embodiments the reducing agent comprises ammonia, urea, or a combination thereof, or a mixture of ammonia or urea with another fluid, such as deionized (DI) water.

In some embodiments, the exhaust apparatus further comprises a diesel oxidation catalyst (DOC) unit disposed upstream of the particulate filter in the exhaust line.

In some embodiments, the porous material of the particulate filter is comprised of one or more selected from the group of cordierite, aluminum titanate, magnesium titanate, silica carbide, mullite, alumina, spinel, and combinations thereof.

In some embodiments, the exhaust treatment apparatus further comprises one or more catalytic exhaust components disposed within the exhaust line housing. In some of these embodiments, one or more of the catalytic exhaust components is selected from the group consisting of a DOC component, an SCR component, and an LNT component.

In some embodiments, the exhaust treatment apparatus further comprises an SCR component disposed within the exhaust line housing and downstream of the first exhaust component. In some of these embodiments, the first exhaust component is a particulate filter.

In some embodiments, the exhaust treatment apparatus further comprises a DOC component and an SCR component disposed within the exhaust line housing, wherein the DOC component is disposed upstream of the first exhaust component and the SCR component is disposed downstream of the first exhaust component. In some of these embodiments, the reducing agent injector junction is disposed between the first exhaust component and the SCR component.

In some embodiments, the exhaust treatment apparatus further comprises a reducing agent injector coupled to the reducing agent injector junction. In some embodiments the exhaust treatment apparatus further comprises a reducing agent doser.

In some embodiments, the first porosity is greater than 40%. In some embodiments, the first porosity is between 40% and 70%.

In some embodiments, the matrix of intersecting walls of the filter body comprises cells present in a pattern of 100 to 600 cells per square inch.

In some embodiments, the matrix of intersecting walls of the filter body comprises cells present in a pattern of substantially similarly shaped cells.

In some embodiments, the outlet channels of the filter body are larger in area than the inlet channels of the filter body.

In some embodiments, the matrix of intersecting walls of the particulate filter comprises cells present in a pattern of 100 to 600 cells per square inch. In some embodiments, the matrix of intersecting walls of the particulate filter comprises cells present in a pattern of 100 to 500 cells per square inch. In some embodiments, the matrix of intersecting walls of the particulate filter comprises cells present in a pattern of 100 to 400 cells per square inch. In some embodiments, the matrix of intersecting walls of the particulate filter comprises cells present in a pattern of 200 to 400 cells per square inch. In some embodiments, the matrix of intersecting walls of the particulate filter comprises cells present in a pattern of 100 to 600 cells per square inch.

In some embodiments, the matrix of intersecting walls of the particulate filter comprises intersecting wall thickness of less than 13 mils. In some embodiments, the matrix of intersecting walls of the particulate filter comprises intersecting wall thickness of 2 to 8 mils. In some embodiments, the matrix of intersecting walls of the particulate filter comprises intersecting wall thickness of 2 to 7 mils. In some embodiments, the matrix of intersecting walls of the particulate filter comprises intersecting wall thickness of 3 to 7 mils. In some embodiments, the matrix of intersecting walls of the particulate filter comprises intersecting wall thickness of 4 to 6 mils.

In some embodiments, the matrix of intersecting walls of the particulate filter comprises cells present in a pattern of 200/6, 300/5, 300/6, 300/7, 300/8, 300/9, 300/10, 300/12, 350/12, 400/7 or 400/4 (in cells per square inch, and wall thickness in mils).

In some embodiments, the particulate filter further comprises the catalyst material disposed on, in, or both on and in at least a portion of the intersecting walls of the particulate filter. In some of these embodiments, the catalyst material comprises a HC oxidation catalyst material or a NO oxidation catalyst material.

FIG. 3 schematically illustrates a test set up used to evaluate or replicate potential damage to a filter wherein a reducing agent injector is disposed downstream of a diesel particulate filter (DPF) such that DEF fluid is sprayed onto the outlet face of the DPF against the exhaust flow that is exiting the DPF. Such a test set up can be used to simulate a vertical SCR system where DEF condensate may fall onto a DPF face against exhaust flow and form deposits thereon.

FIG. 4 is a photographic image of a cross-section of a diesel particulate filter with no coating or reinforced portion, which illustrates the damage that was sustained as a result of contact with DEF fluid and/or byproducts thereof.

FIG. 5 is a photographic image of a transverse plugged end face of a diesel particulate filter with a reinforced portion comprising a coating from a loading of 80 g/l first coating material mixture as disclosed herein, which illustrates mitigation of damage from contact with DEF fluid and/or byproducts thereof after 6 hours of DEF exposure testing.

FIG. 6 is a photographic image of a transverse plugged end face of a diesel particulate filter with a reinforced portion comprising a coating from a loading of 160 g/l first coating material mixture as disclosed herein, which illustrates mitigation of damage from contact with DEF fluid and/or byproducts thereof after 6 hours of DEF exposure testing.

FIG. 7 is a photographic image of a transverse plugged end face of a diesel particulate filter with a reinforced portion comprising a coating from a loading of 160 g/l second coating material mixture as disclosed herein, which illustrates mitigation of damage from contact with DEF fluid and/or byproducts thereof after 6 hours of DEF exposure testing.

Figure 8:
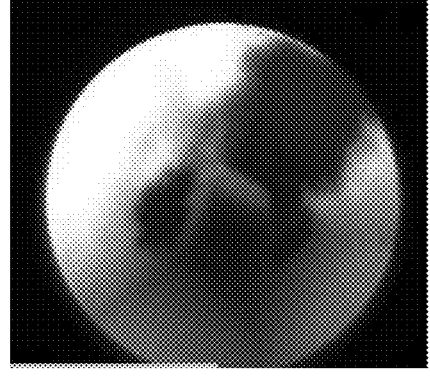
FIG. 8 is a photographic image using a borescope of channel walls of a diesel particulate filter with a reinforced portion comprising a coating from a loading of 80 g/l first coating material mixture as disclosed herein, after 6 hours of DEF exposure testing.

FIG. 8 is a photographic image using a borescope of channel walls of a diesel particulate filter with a reinforced portion comprising a coating from a loading of 80 g/l first coating material mixture as disclosed herein, after 6 hours of DEF exposure testing.

Figure 9:
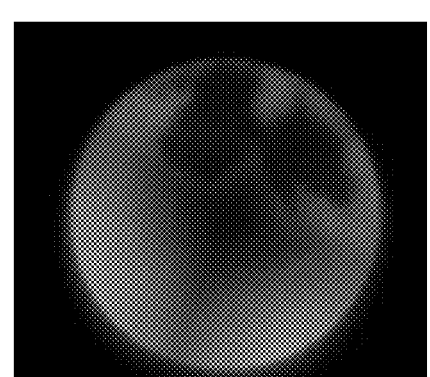
FIG. 9 is a photographic image using a borescope of channel walls of a diesel particulate filter with a reinforced portion comprising a coating from a loading of 160 g/l first coating material mixture as disclosed herein, after 6 hours of DEF exposure testing.

FIG. 9 is a photographic image using a borescope of channel walls of a diesel particulate filter with a reinforced portion comprising a coating from a loading of 160 g/l first coating material mixture as disclosed herein, after 6 hours of DEF exposure testing.

FIG. 10 is a photographic image using a borescope of channel walls of a diesel particulate filter with a reinforced portion comprising a coating from a loading of 160 g/l second coating material mixture as disclosed herein, after 6 hours of DEF exposure testing.

FIG. 11 schematically illustrates the normalized pressure drop (in kPa) across the filters of FIGS. 5, 6, and 7 at 1250 m3/hour and 200° C. at various soot loadings (in g/l: grams of soot per liter of filter volume).

In some embodiments, the reinforced exhaust treatment article disclosed herein can help to reduce or mitigate damage to the article from particles, chemicals, and/or deposits, and in some embodiments provides enhanced mechanical resistance. The reinforced exhaust treatment article can be a component in a DOC+DPF+SCR architecture, which can be installed horizontally or vertically, for example. Some SCR damage has been observed and attributed to urea byproducts and deposits accumulating near the face adjacent to the SCR, for example.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A ceramic body for treating an exhaust gas, comprising:
a first end and a second end opposite the first end;
a honeycomb structure extending from a first end face at the first end to a second end face at the second end face in an axial direction, the honeycomb structure formed by a plurality of intersecting porous ceramic walls defining a plurality of channels extending in the axial direction, at least some channels of the plurality of channels comprising a plugging material disposed in an end thereof;
a metal oxide coating disposed on at least one of the first end face of the honeycomb structure or the second end face of the honeycomb structure; and
wherein the metal oxide coating comprises alumina nanoparticles with a median particle size between 10 nm and 50 nm and alumina microparticles with a median particle size between 0.1 um and 20 μm.

2. The ceramic body of claim 1, wherein the metal oxide coating extends to a depth into the honeycomb structure of at least 0.01 inches but not exceeding 2.0 inches from the respective end face of the honeycomb structure.

3. The ceramic body of claim 1, wherein the metal oxide coating extends to a depth into the honeycomb structure of at least 0.01 inches but not exceeding 1.0 inch from the respective first or second end face of the honeycomb structure.

4. The ceramic body of claim 1, wherein the metal oxide coating extends to a depth into the honeycomb structure of at least 0.01 inches but not exceeding 0.5 inches from the respective first or second end face of the honeycomb structure.

5. The ceramic body of claim 1, wherein the metal oxide coating coats surfaces of the plurality of intersecting porous walls no greater than 0.5 inches into the honeycomb structure from the respective first or second end face of the honeycomb structure.

6. The ceramic body of claim 1, wherein the metal oxide coating is present at a loading between 40 grams/liter (g/l) and 200 g/l per liter of the ceramic body in contact with the metal oxide coating.

7. The ceramic body of claim 1, wherein the metal oxide coating is free of a HC oxidation catalyst material or a NO oxidation catalyst material.

8. An exhaust treatment apparatus for treating exhaust gas, comprising:

a reducing agent injector disposed on the exhaust line housing;

a ceramic filter body comprising a first end and a second end opposite the first end, the ceramic filter body further comprising:

a honeycomb structure extending from a first end face of the honeycomb structure at the first end of the ceramic filter body to a second end face at the second end of the ceramic filter body in an axial direction, the honeycomb structure formed by a plurality of intersecting porous ceramic walls defining a plurality of channels extending in the axial direction;

a metal oxide coating disposed on at least one of the first end face or the second end face; and wherein the metal oxide coating comprises alumina nanoparticles with a median particle size between 10 nm and 50 nm and alumina microparticles with a median particle size between 0.1 μm and 20 μm.

9. The exhaust treatment apparatus of claim 8, wherein the metal oxide coating extends to a depth into the honeycomb structure of at least 0.01 inches but not exceeding 2.0 inches from the respective end face of the honeycomb structure.

10. The exhaust treatment apparatus of claim 8, wherein the metal oxide coating extends to a depth into the honeycomb structure of at least 0.01 inches but not exceeding 1.0 inch from the respective first or second end face of the honeycomb structure.

11. The exhaust treatment apparatus of claim 8, wherein the metal oxide coating extends to a depth into the honeycomb structure of at least 0.01 inches but not exceeding 0.5 inches from the respective first or second end face of the honeycomb structure.

12. The exhaust treatment apparatus of claim 8, wherein the metal oxide coating coats surfaces of the plurality of intersecting porous walls no greater than 0.5 inches into the honeycomb structure from the respective first or second end face of the honeycomb structure.

13. The exhaust treatment apparatus of claim 8, wherein the metal oxide coating is present at a loading between 40 grams/liter (g/l) and 200 g/l per liter of the ceramic body in contact with the metal oxide coating.

14. The exhaust treatment apparatus of claim 8, wherein the metal oxide coating is free of a HC oxidation catalyst material or a NO oxidation catalyst material.

15. The exhaust treatment apparatus of claim 8, wherein the reducing agent junction is positioned upstream of the ceramic filter body relative to a flow direction of the exhaust gas.

16. The exhaust treatment apparatus of claim 8, wherein the reducing agent junction is positioned downstream of the ceramic filter body relative to a flow direction of the exhaust gas.

17. The exhaust treatment apparatus of claim 8, wherein the reducing agent injector configured to inject a reducing agent comprising at least one of ammonia or urea into the exhaust line.

18. The exhaust treatment apparatus of claim 8, at least some of the channels comprise a plugging material plugging an end thereof.

\* \* \* \* \*